(No Model.)
C. E. FOSTER.
ELEVATOR.
No. 452,370. Patented May 19, 1891.
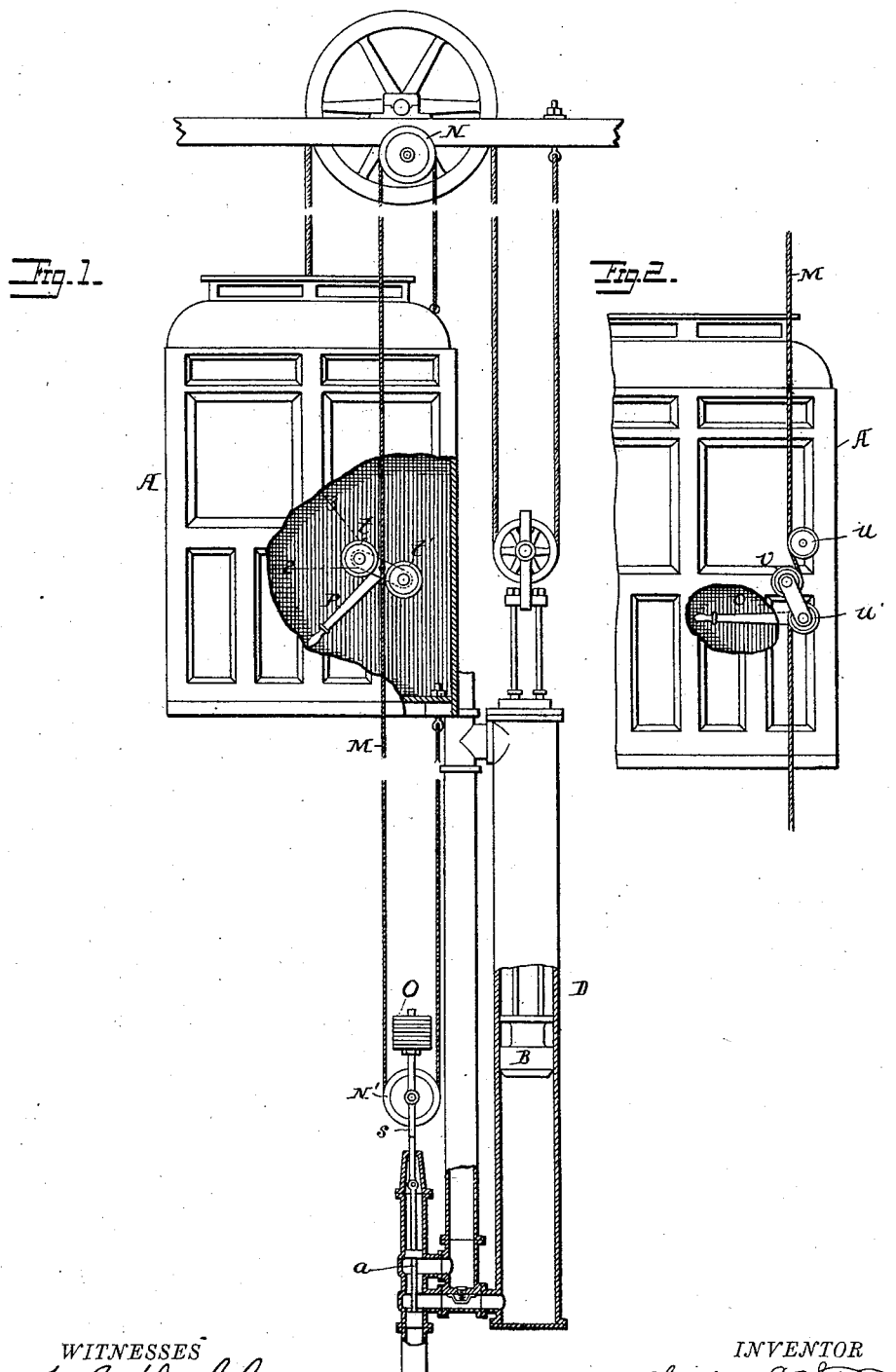
WITNESSES
INVENTOR
Charles E. Foster.
By Foster & Freeman
Attorney

UNITED STATES PATENT OFFICE.

CHARLES E. FOSTER, OF WASHINGTON, DISTRICT OF COLUMBIA, ASSIGNOR TO THE HYDRAULIC ELEVATOR COMPANY, OF CHICAGO, ILLINOIS.

ELEVATOR.

SPECIFICATION forming part of Letters Patent No. 452,370, dated May 19, 1891.

Application filed April 17, 1890. Serial No. 348,324. (No model.)

*To all whom it may concern:*

Be it known that I, CHARLES E. FOSTER, a citizen of the United States, residing at Washington, in the District of Columbia, have invented certain new and useful Improvements in Elevators, of which the following is a specification.

My invention relates to elevators; and it consists of means, fully set forth hereinafter, whereby to change the position of the stopping and starting device of an elevator from the cage through the medium of a traveling rope.

In the accompanying drawings, Figure 1 is an elevation of sufficient of a hydraulic elevator to illustrate my invention. Fig. 2 is a view illustrating a modification.

The cage A may be in the form of a cage, as shown, or of a platform, and may be connected with the flexible suspensories passing around pulleys, one of which is connected with the piston B of an elevating-engine D, as shown, or it may be mounted directly upon the plunger or piston-rod of such engine, as is common in many cases, or the flexible suspensories may be passed around the winding-drum of an elevator-engine in which steam or electricity is used as the motor power. The character of the engine and of the motor power and connections are immaterial so far as my invention is concerned, which relates to the appliances for operating the stopping and starting device, whether it be a valve, belt-shifter, or switch.

As illustrated in the drawings, the stopping and starting device is a valve $a$, capable of being shifted to three positions to vary the action of the engine. Thus when elevated to its upper position the valve permits the water to flow from the bottom of the cylinder, while water under pressure passes to the top of the cylinder, depressing the piston and elevating the cage. When the valve is in its lowest position, as shown, the water can pass from the upper end to the lower end of the cylinder, circulating through the valve-casing, and the piston will rise, permitting the cage to descend. When the valve is in its mid-position, the outflow of water is arrested and the cage is held stationary. To effect these requisite changes in the position of the valve, I make use of a traveling rope M, connected to the cage to travel therewith and passing around two pulleys N N' at the upper and lower ends of the well, one of said pulleys being fixed and the other being movable and connected with the valve to operate the same. As shown, the lower pulley N' is carried in a stirrup S, connected to or formed with the stem of the valve $a$ and provided with a weight O, so as normally to descend under the action of said weight. Upon the cage I arrange any suitable appliance from which the traveling rope is normally free, but whereby the traveling rope may be drawn up or let out to thereby alter the vertical position of the movable pulley and with it the position of the valve.

As shown in Fig. 1 of the drawings, the cable-operating device consists of a frame provided with an operating-handle $p$ within the cage and carrying two grooved pulleys $t\,t'$ outside of the cage, so arranged that the cable passes between them. When the pulleys are set in the position shown in Fig. 1 of the drawings, the cable M is free from contact with the operating device and the valve $a$ is in its lowest position and the cage is descending. To arrest the movements of the cage, the handle $p$ is turned to the position shown in dotted lines 2, when the cable will be sufficiently kinked and shortened to bring the valve $a$ to its mid-position, and by depressing the handle $p$ to the position shown in full lines the cage may again be started downward. If, however, instead of starting downward it is desired to start the cage upward, the handle $p$ is carried from the position 2 to the position shown in dotted lines 3, when the cable will be so operated as to raise the valve to its upper position, when the cage will rise.

I do not limit myself to the construction of cable-operating device heretofore described, as others having like characteristics may be employed—as, for instance, two pulleys $u\,u'$, Fig. 2, turning on fixed pivots on the cage, and the movable pulley $v$, connected with the operating-handle $p$, the cable normally, when it is straight, passing between the pulleys $u\,u'$ and $v$ without contact, but being in contact therewith when the pulley $v$ is carried between the pulleys $u\,u'$, as shown.

Without limiting myself to the precise construction and arrangement of parts shown, I claim—

1. The combination, with the cage, engine, and stopping and starting device of an elevator, of a cable connected to fixed portions of the cage and passing around upper and lower pulleys within the well, one of which is movable and connected with the stopping and starting device, and a cable-operating device upon the cage provided with pulleys, between which the traveling rope passes and normally independent of the said cable, substantially as set forth.

2. The combination, with the cage, engine, and stopping and starting device of an elevator, of a cable connected to travel with the cage and pulleys at the top and bottom of the well, one fixed and the other movable and connected with the stopping and starting device, and a frame upon the cage provided with an operating-handle and carrying pulleys, between which the cable passes and normally free from contact with said rope, substantially as set forth.

In testimony whereof I have signed my name to this specification in the presence of two subscribing witnesses.

CHARLES E. FOSTER.

Witnesses:
W. S. McARTHUR,
J. S. BARKER.